(12) United States Patent
Kleinewegen et al.

(10) Patent No.: US 11,035,419 B2
(45) Date of Patent: Jun. 15, 2021

(54) MULTI-PLATE CLUTCH WITH IMPROVED AXIAL OFFSET STOP AND INDUSTRIAL APPLICATION

(71) Applicant: Flender GmbH, Bocholt (DE)

(72) Inventors: Stefan Kleinewegen, Bocholt (DE); Jens Steggemann, Stadtlohn (DE)

(73) Assignee: FLENDER GMBH, Bocholt (DE)

( * ) Notice: Subject to any disclaimer, the term of this patent is extended or adjusted under 35 U.S.C. 154(b) by 89 days.

(21) Appl. No.: 16/262,586

(22) Filed: Jan. 30, 2019

(65) Prior Publication Data
US 2019/0234465 A1 Aug. 1, 2019

(30) Foreign Application Priority Data
Jan. 31, 2018 (EP) .................................. 18154424

(51) Int. Cl.
*F16D 3/79* (2006.01)
*F16D 13/52* (2006.01)

(52) U.S. Cl.
CPC ............... *F16D 13/52* (2013.01); *F16D 3/79* (2013.01)

(58) Field of Classification Search
CPC ... F16D 13/52; F16D 3/79; F16D 3/06; F16D 3/78; F16B 37/14; Y10T 29/49844; F01D 5/02; F01D 5/025; F04D 29/263; F04D 29/266
See application file for complete search history.

(56) References Cited

U.S. PATENT DOCUMENTS

| 2,639,595 | A | | 5/1953 | Werner | |
|---|---|---|---|---|---|
| 3,603,108 | A | * | 9/1971 | Herbert | F16D 3/78 464/95 |
| 4,055,966 | A | * | 11/1977 | Fredericks | F16D 3/79 464/99 |
| 4,744,783 | A | * | 5/1988 | Downey | F16D 3/79 464/147 |
| 6,200,223 | B1 | * | 3/2001 | Martens | F16D 3/78 464/99 |
| 8,002,639 | B2 | | 8/2011 | Mayr et al. | |
| 8,932,022 | B2 | * | 1/2015 | Ivakitch | F16B 19/02 416/204 R |
| 10,415,648 | B2 | * | 9/2019 | Chase | F16D 3/78 |

FOREIGN PATENT DOCUMENTS

| CN | 201475197 U | 5/2010 |
|---|---|---|
| CN | 101825144 A | 9/2010 |
| CN | 205877023 U | 1/2017 |
| DE | 1675255 A1 | 12/1970 |
| DE | 19724772 A1 | 12/1998 |
| DE | 102006009594 A1 | 9/2007 |
| GB | 1396200 A | 6/1975 |

* cited by examiner

*Primary Examiner* — David J Hlavka
(74) *Attorney, Agent, or Firm* — Henry M. Feiereisen LLC

(57) ABSTRACT

A multi-plate clutch includes a plate fin and first and second flanges connected to one another in a torque-transmitting manner via the plate fin. A screw fastener braces the plate fin on a first lamellar bore with the first flange, and a first spacer element is arranged on the plate fin to support a first axial movement of the second flange.

20 Claims, 4 Drawing Sheets

MULTI-PLATE CLUTCH WITH IMPROVED AXIAL OFFSET STOP AND INDUSTRIAL APPLICATION

CROSS-REFERENCES TO RELATED APPLICATIONS

This application claims the priority of European Patent Application, Serial No. 18154424.8, filed Jan. 31, 2018, pursuant to 35 U.S.C. 119(a)-(d), the disclosure of which is incorporated herein by reference in its entirety as if fully set forth herein.

BACKGROUND OF THE INVENTION

The present invention relates to a multi-plate clutch which has an improved axial offset stop. The invention also relates to an industrial application which is equipped with a corresponding multi-plate clutch The following discussion of related art is provided to assist the reader in understanding the advantages of the invention, and is not to be construed as an admission that this related art is prior art to this invention.

In a plurality of applications there is a desire to provide a multi-plate clutch which is suitable for compensating for an axial offset of a shaft connected via the clutch. Maximum values must be observed for the axial offset to be compensated. At the same time, the corresponding multi-plate clutch is simple to design. There is therefore a need for a multi-plate clutch which offers reliable compensation for an axial offset, also functions reliably upon reaching a maximum value of axial offset and can be produced simply and economically.

It would therefore be desirable and advantageous to provide an improved multi-plate clutch to obviate prior art shortcomings.

SUMMARY OF THE INVENTION

According to one aspect of the present invention, a multi-plate clutch includes a plate fin, first and second flanges connected to one another in a torque-transmitting manner via the plate fin, a screw fastener configured to brace the plate fin on a first lamellar bore with the first flange, and a spacer element arranged on the plate fin to support a first axial movement of the second flange.

In accordance with the present invention, the first and second flanges of the multi-plate clutch are arranged opposite each other in the assembled state. A plate fin is arranged between the first and second flange which is designed to connect the first to the second flange in a torque-transmitting manner. The plate fin is provided with a first lamellar bore in which a screw fastener is accommodated. Via the screw fastener, the plate fin is braced with the first flange, i.e., fastened to the first flange.

It is to be understood by persons skilled in the art that the term "screw fastener" is used in the disclosure in a generic sense and the principles described in the following description with respect to the screw fastener are equally applicable to any other type of screw fastener which generally follows the concepts outlined here, such as, e.g., a bolt, a fitting screw, or any comparable detachable construction element.

On a front side or end face of the plate fin facing the second flange, a spacer element is arranged in accordance with the present invention and has a front side facing the second flange. The spacer element is designed to support the second flange during an axial movement of the second flange in the direction of the first flange. For this purpose, the second flange strikes against the front side of the spacer element facing the second flange. When the second flange strikes the spacer element, a pressure force is introduced from the second flange into the plate fin via the spacer element. In this case, the axial movement of the second flange is to be interpreted as a change in an axial offset between the first and second flange.

In an operating state according to the intended mode of operation in which there is no contact between the spacer element and the second flange, the spacer element is essentially free of forces and stress along the axial direction, i.e., the direction of the axial movement. In terms of design, a wide range of dimensions of the spacer element along the axial direction can be selected. As a result, based on an operating state according to the intended mode of operation without contact between the spacer element and the second flange, a maximum axial offset between these can be selected. Furthermore, the spacer element can be installed in a simple and space-saving form in an existing multi-plate clutch. The solution according to the invention may thus be applied in an existing multi-plate clutch through a simple retrofit. The spacer element has a simple geometry overall and can thus be produced cost-effectively. Overall, an improved axial offset stop is thereby provided for the multi-plate clutch.

According to another advantageous feature of the present invention, the spacer element can be arranged radially on a lamellar packet ring. The plate fin can be arranged between lamellar packet rings and pressed into a lamellar packet. When the multi-plate clutch is installed, the lamellar packets and the plate fin are pressed against a front side of the first flange. Plate fins frequently extend over the lamellar packet rings in a radial direction, resulting in an intermediate space between a lateral surface of the lamellar packet ring and a front side of the plate fin. This intermediate space is at least partially used by the spacer element and in this way a compact axial offset stop is realized. Due to the radial arrangement of the spacer element on the lamellar packet ring, the spacer element has an enlarged end face which is suitable for striking the second flange. As a result of the enlarged end face, an axial force which causes the axial movement of the second flange is distributed over a larger area on the spacer element and the existing mechanical strain is thus reduced. As a result, the spacer element is suitable for withstanding a high number of stops by the second flange. Consequently, the claimed multi-plate clutch has an increased service life.

According to another advantageous feature of the present invention, the spacer element in facing relation to the second flange can have a front side defining a contact area for striking the second flange. For this purpose, the contact area may, for example, be designed from a hardened material. As an alternative, or in addition, a coating can also be applied in the contact area. Such a coating can be made of a rubber or rubber-like material which provides noise attenuation.

According to another advantageous feature of the present invention, the spacer element arranged between the plate fin and the second flange can be configured for movement in an axial direction. To this end, the spacer element may have a smaller axial dimension than the intermediate space between the plate fin and the second flange. Thus, the spacer element also has a smaller axial dimension than the lamellar packet ring on which the spacer element is arranged radially. Furthermore, axial mobility of the spacer element is ensured in that a clearance fit or transition fit is present in a radial direction between the lamellar packet ring and the spacer element. The need for press fits in an axial or radial direction, which are associated with a high expenditure of force during installation, is thus avoided. Consequently, a multi-plate clutch according to the present invention can be produced simply and quickly as well as in the course of a retrofit.

According to another advantageous feature of the present invention, the spacer element can be configured ring-shaped or C-shaped. A ring-shaped spacer element, also referred to as a spacer ring, offers easy installation and production. Furthermore, ring-shaped spacer elements also ensure uniform distribution of mass about an axis of rotation of the multi-plate clutch in the case of multi-plate clutches with a plurality of connections between the plate fin and one or both flanges. A uniform distribution of mass about the axis of rotation of the multi-plate clutch leads to minimized imbalance and to improved concentricity behavior of the multi-plate clutch. The claimed solution can thus be implemented in a retrofit of an existing multi-plate clutch without the risk of a deterioration in their concentricity properties. Furthermore, ring-shaped spacer elements can be suited in a simple manner to an application at hand. An essentially C-shaped spacer element provides a reduction in weight so that in particular the rotating mass of a multi-plate clutch is only slightly increased by one or more corresponding spacer elements. Furthermore, essentially C-shaped spacer elements can be deformed in an axial direction with a reduced exertion of force, and can thus be easily installed. Essentially C-shaped is here understood to mean any form of spacer element which permits a form fit in a radial direction.

According to another advantageous feature of the present invention, the spacer element can be made of steel, plastic material, or soft metal. Steel provides a high level of mechanical strength and thus increased service life. A spacer element made of plastic material can be produced cost-effectively and offers a particular degree of noise attenuation as a stop for the second flange. Plastics usually have a reduced hardness compared with metallic materials. Damage to the plate fin or the lamellar packet ring by the spacer element is minimized by the use of plastic material. In addition, a spacer element made of plastic material ensures electrical insulation. Likewise, a spacer element of soft metal provides noise attenuation and, compared with plastic material, increased strength. The term "soft metal" relates, for example, to material such as bronze, brass, aluminum, copper or an aluminum and/or copper alloy. Furthermore, in a differential design the spacer element can also be produced from a multiplicity of components which are produced from corresponding different materials.

According to another advantageous feature of the present invention, a sleeve and/or catch ring can be provided to brace the plate fin with the first flange. In addition, or as an alternative, the plate fin may also be braced with the first flange via the lamellar packet ring. For this purpose, a clamping force is exerted in an axial direction by the nut attached to the screw fastener, which is guided by means of mechanical contact through the catch ring, the lamellar packet and/or the sleeve to the first flange and a screw head of the screw fastener. In one embodiment of a multi-plate clutch according to the present invention, a flow of force can occur from a nut to the adjacent catch ring, to the lamellar packet with the plate fin and the lamellar packet rings to the first flange and to the screw head of the screw fastener. In this case, the sleeve is essentially concentrically accommodated in the plate fin and the lamellar packet rings and has a smaller axial dimension than the lamellar packet. As a result, the flow of force from the nut to the first flange is guided around the sleeve.

According to another advantageous feature of the present invention, a nut attached to the first screw fastener can have a collar to support a second axial movement of the second flange. The collar is designed in such a way that in the event of a second axial movement of the second flange, the collar allows the nut to be supported on the second flange. The collar has a corresponding outer diameter for this purpose. The second axial movement, against which the nut is supported against the second flange, is opposed to the first axial movement which is supported by the spacer element.

According to another advantageous feature of the present invention, the spacer element can be configured as a disk spring. As a result, the first axial movement, in which the flanges approach one another, can be cushioned, and noise development thus reduced compared to a hard, i.e. unsprung, striking. As a result, wear on the spacer element is further reduced and the service life of the spacer element thus increased. Disk springs are readily available with a wide range of spring properties and are cost-effective.

According to another advantageous feature of the present invention, a plurality of said plate fin and a plurality of assigned lamellar packet rings can be arranged between the first and second flanges. The lamellar packet rings and the plate fins are arranged alternately one after another in an axial direction. When using a plurality of plate fins, the spacer element is advantageously arranged on the plate fin which is positioned closest to the second flange. The claimed solution is therefore suitable for multi-plate clutches of different orders of magnitude.

According to another advantageous feature of the present invention, a second screw fastener can be provided to brace the plate fin on a second lamellar bore with the second flange in the region of the second lamellar bore. For this purpose, the screw fastener is accommodated in the second lamellar bore and in the second flange. A spacer element is furthermore arranged on a front side of the plate fin facing the first flange. The spacer element is designed to support an axial movement of the first flange. The connection between the plate fin and the second flange on the second lamellar bore essentially corresponds to a symmetrical reflection of the connection between the plate fin and the first flange on the first lamellar bore. Furthermore, the connections between the plate fin and the flanges on different lamellar bores can also be arranged, viewed in the circumferential direction, in an alternating fashion, i.e., by turns.

According to another aspect of the present invention, an industrial application includes a drive having an output shaft for transmitting a drive power, a mechanical device having an input shaft for receiving the drive power from the drive, and a multi-plate clutch configured to connect the output shaft of the drive and the input shaft of the mechanical device in a torque-transmitting manner, the multi-plate clutch including a plate fin, first and second flanges connected to one another in a torque-transmitting manner via the plate fin, a screw fastener configured to brace the plate fin on a first lamellar bore with the first flange, and a spacer element arranged on the plate fin to support a first axial movement of the second flange.

The drive can be designed as a motor, for example as an electric motor, and the output shaft is designed to forward the drive power output by the drive. The input shaft is designed to supply the mechanical application with the necessary drive power. The mechanical application can be, for example, a mill, a vertical mill, an ore or rock crusher, an extruder, a conveyor system, a pump, a fan, a compressor or a crane. The output shaft and the input shaft are connected to one another by way of a multi-plate clutch according to the present invention so as to ensure a transmission of drive power, i.e., torque and rotational speed, from the output shaft of the drive to the input shaft of the mechanical application. The multi-plate clutch is designed according to at least one of the aforementioned embodiments for this purpose.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
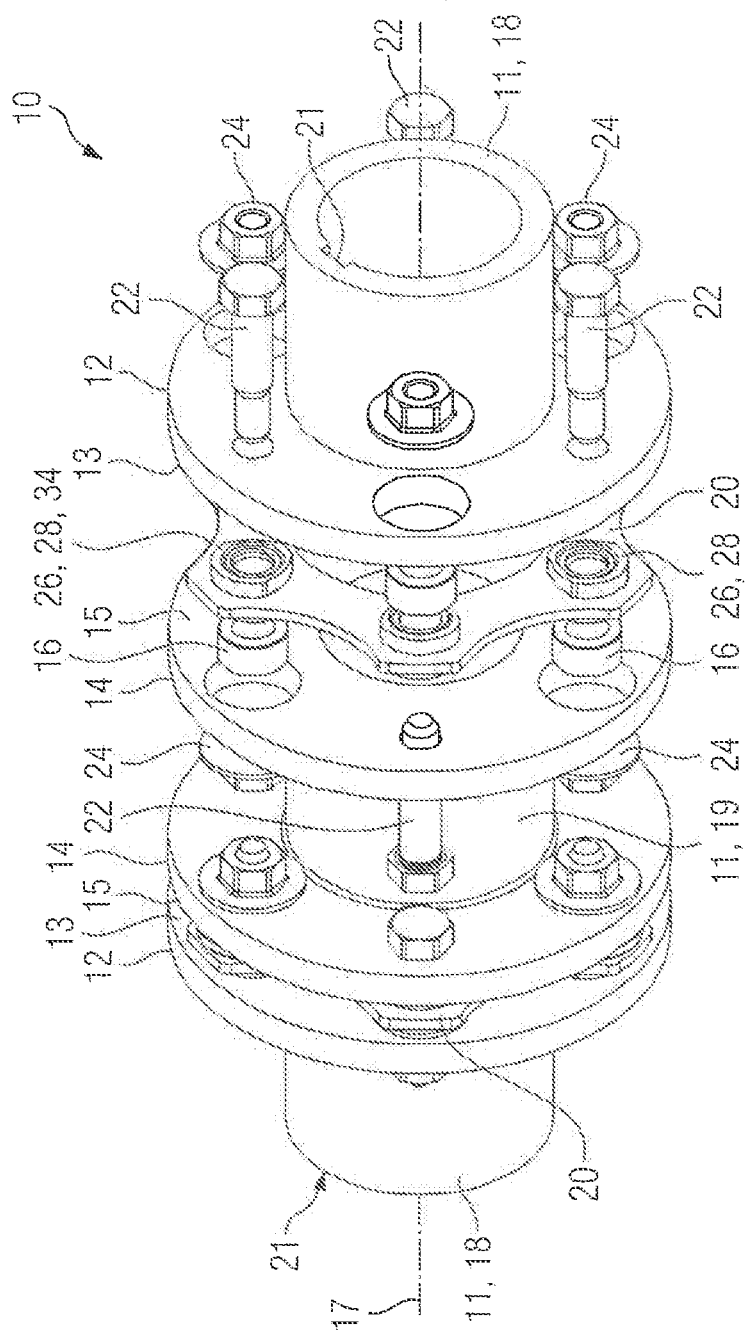
FIG. 1 is a diagonal view of a conventional multi-plate clutch in a partial exploded view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a diagonal view of a conventional multi-plate clutch 10 in a partial exploded view. The multi-plate clutch 10 includes clutch components 11 which are axially arranged one after another along an axis of rotation 17. The clutch components 11 include axis connecting parts 18 and an intermediate sleeve 19 arranged between them. Keyways 21 are formed in the axis connecting parts 18 which ensure torque transmission to the multi-plate clutch 10. Between the axis connecting parts 18 and the intermediate sleeve 19, there are respective flange connections, each having a first flange 12 and a second flange 14. The first flange 12 has a first end face 13 and the second flange 14 a second end face 15. The first and second end faces 13, 15 face each other respectively in the assembled state. A plate fin 20 is arranged between the end faces 13, 15 of the first and second flanges 12, 14. At least one plate fin 20 has a plurality of lamellar bores 28 in which an axial socket 34 and lamellar packet rings 26 are accommodated in each case. A screw fastener 22 is accommodated in each lamellar bore 28 upon which in turn a catch ring 16 is arranged. The catch rings 16 are each braced on the screw fastener 22 with a nut 24. By aligning the screw fasteners 22, adjacent lamellar bores 28 are alternately clamped to the first or second flange 12, 14. By this means a torque-transmitting connection is provided between the first and second flange 12, 14 by way of the plate fin 20. The plate fins 20 are pliable in design and therefore suitable for exerting a slight restoring force in the manner of a joint in the case of a shaft offset. Through the interaction of two such joints, compensation of a radial shaft displacement takes place.

Figure 2:
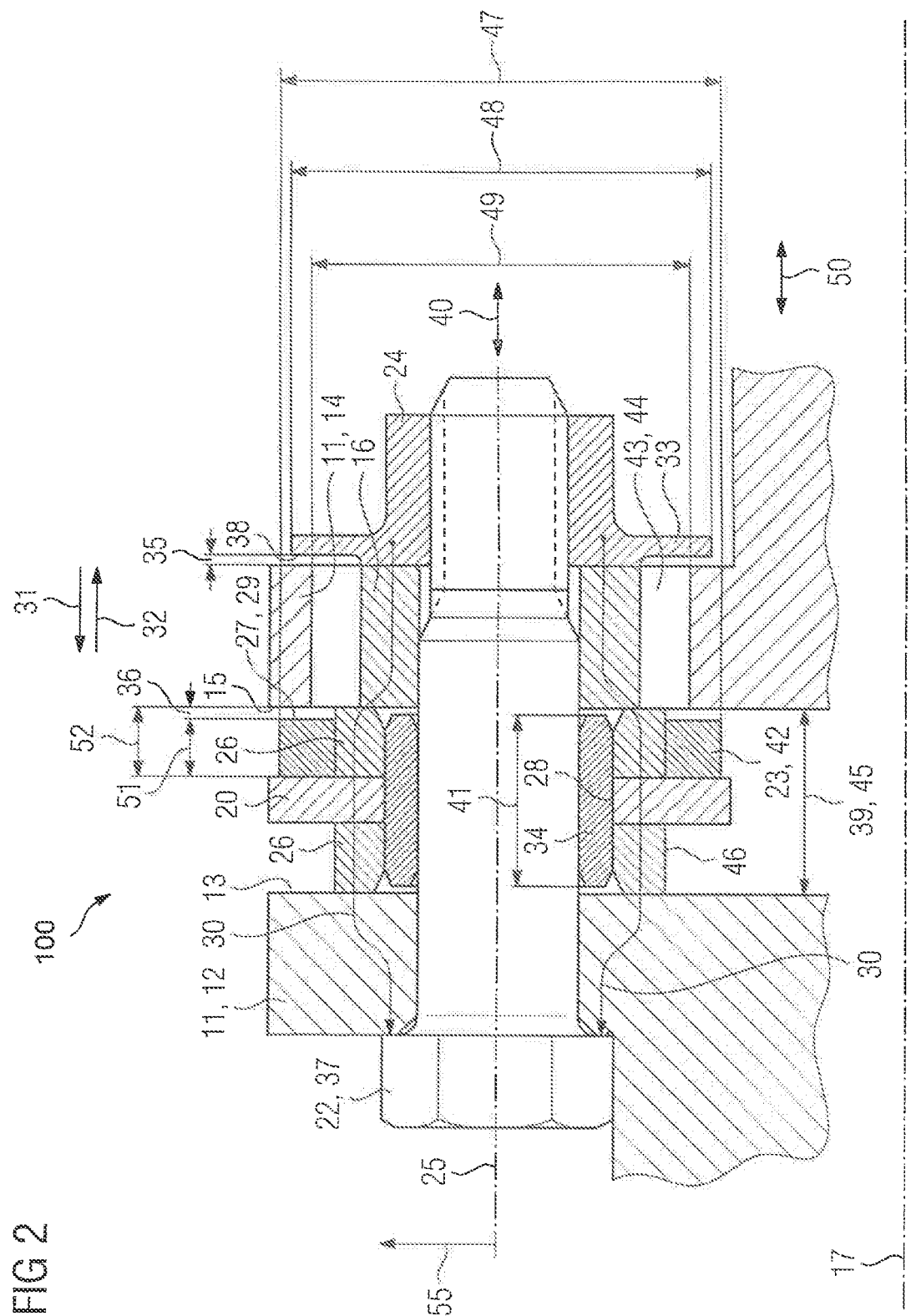
FIG. 2 is a longitudinal section of a detailed view of a multi-plate clutch according to the present invention.

FIG. 2 is a longitudinal section of a detailed view of a multi-plate clutch according to the present invention, generally designated by reference numeral 100. In the following description, parts corresponding with those in FIG. 1 will be identified, where appropriate for the understanding of the invention, by corresponding reference numerals. The multi-plate clutch 100 includes clutch components 11 on which a first and/or second flange 12, 14 is formed. A plate fin 20 is arranged between opposing end faces 13, 15 of the flanges 12, 14 which is designed to ensure torque transmission between the flanges 12, 14. The plate fin 20 belongs to a lamellar packet 39 having lamellar packet rings 26 which are each positioned between the plate fin 20 and the opposing first and/or second flange 12, 14. Furthermore, an axial socket 34, which in turn is mounted on a screw fastener 22, is accommodated in a lamellar bore 28 in the plate fin 20. Furthermore, a nut 24 which is designed as a special nut with a collar 33 is mounted at one end of the screw fastener 22. A catch ring 16 resting thereon is braced against a lamellar packet ring 16 by way of the nut 24. In this way, a flow of force 30 is caused which passes from the nut 24 through the catch ring 16, the lamellar packet rings 26, the plate fin 20, the end face 13 of the first flange 12 and the first flange 12 itself to a screw head 37 of the screw fastener 22. The axial socket 34 has an axial length 41 which falls below an axial distance 45 between the end faces 13, 14 of the first and second flange 12, 14. As a result of this design, the axial socket 34 is bypassed by the flow of force 30 and is force-free along a screw axis 25 in an operating state according to the intended mode of operation. The screw axis 25 is essentially aligned parallel to an axis of rotation 17 of the multi-plate clutch. Accordingly, a radial direction in accordance with the arrow 55 is to be interpreted with regard to the screw axis 25.

The catch ring 16 is positioned in a recess 43 in the second flange 14. A clear intermediate space 44 is thus formed between the catch ring 16 and the second flange 14 so that no force transmission to the second flange 14 takes place through the catch ring 16. Furthermore, the nut 24 is arranged on a side of the second flange 14 facing away from the plate fin 20. Between the collar 33 and the second flange 14 there is collar play 35 along the screw axis 25 in the properly assembled state. Between the nut 24 and the second flange 14 there is also no force transmission in the properly assembled state, which is also free of axial forces 40.

A spacer element 23 is arranged between the plate fin 20 and the end face 15 of the second flange 14 which serves as an axial offset stop 42. The spacer element 23 is essentially ring-shaped in design and is arranged on a radial external surface 46 of the lamellar packet ring 26 between the end face 15 of the second flange 14 and the plate fin 20. The spacer element 23 has an outer diameter 47 so that a contact area 29 is formed on a front side 27 of the spacer element 23 which is suitable for striking at least part of the end face 15 of the second flange 14. In the case of an axial force 40 which approximates the second flange 14 to the first flange 12, i.e., a first axial movement 31 between the flanges 12, 14, accordingly an axial offset 50 between the flanges 12, 14 is accordingly restricted by the striking of the second flange 14 on the contact area 29 of the spacer element 23. In the case of an axial force 40 on the second flange 14 which moves the flanges 12, 14 away from one another, in other words, in the case of a second axial movement 32 which is directed against the first axial movement 31, the second flange 14 strikes the collar 33 of the nut 24. The collar diameter 48, i.e., the outer diameter of the nut 24, extends beyond the recess diameter 49 of the recess 43 in the second flange 14 for this purpose.

The spacer element 23 has an axial dimension 51 which is less than an axial distance 52 between the plate fin 20 and the front side 15 of the second flange 14 so that there is axial play 36 between the spacer element 23 and the end face 15 of the second flange 14. The spacer element 23 is furthermore dimensioned such that it is axially movable on the lamellar packet ring 26. Likewise, a collar stop 38 is formed on the second flange 14 which is suitable for supporting the collar 33 during a second axial movement 32 and thus restricting a corresponding axial offset 50. Axial forces are specifically absorbed by the contact area 29 and the collar stop 38 of the first and/or second axial movement 31, 32. The spacer element 23 is produced from a corresponding material, for example, a steel, a soft metal or a plastic material for this purpose. By selecting the appropriate material, the spacer element 23 can be adapted to withstand a high number of stops in the contact area 29, and/or to provide a high degree of noise attenuation. The spacer element 23 can be produced in a simple and economic manner and as a result can be used advantageously as a wearing part. By virtue of the fact that the spacer element 23 rests essentially radially on the outside on the lamellar packet ring 26, it can be installed in an existing multi-plate clutch 10 in a space-saving manner and also in the context of a retrofit.

Figure 3:
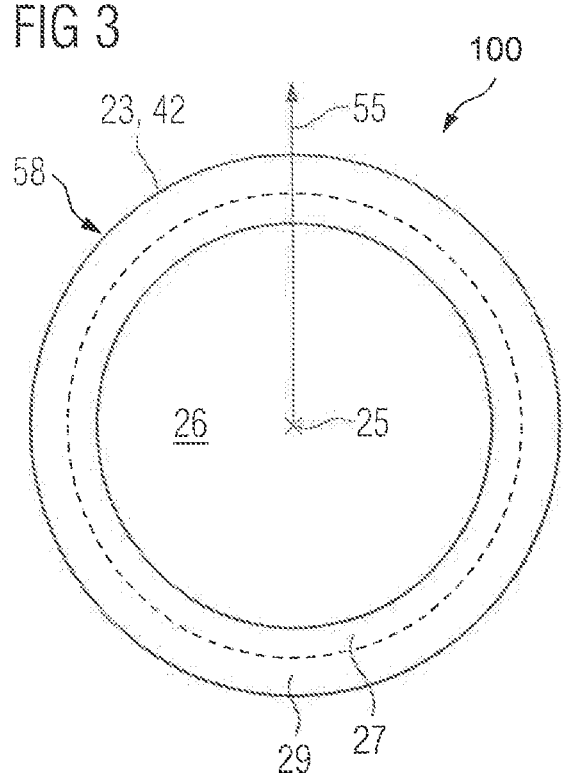
FIG. 3 is a frontal view of a first embodiment of a spacer element for use in a multi-plate clutch according to the present invention.
Figure 4:
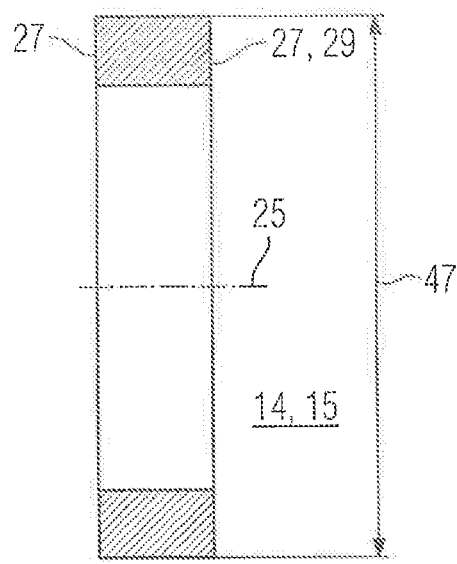
FIG. 4 is a sectional view of the spacer element of FIG. 3.

FIG. 3 and FIG. 4 show a first embodiment of a spacer element 23 which can be used in the multi-plate clutch 100 for the axial offset stop 42. The spacer element 23 has a ring shape 58 for this purpose. In a radial external area on a front side 27 of the spacer element 23, which in the assembled state faces an end face 15 of a second flange 14, a contact area 29 is formed. The contact area 29 is suitable for supporting the end face 15 of the second flange 14. The size of the contact area 29 is defined inter alia by the outer diameter 47 of the spacer element 23. With regard to a screw axis 25, a radial direction is understood to mean a direction in accordance with the arrow 55.

Figure 5:
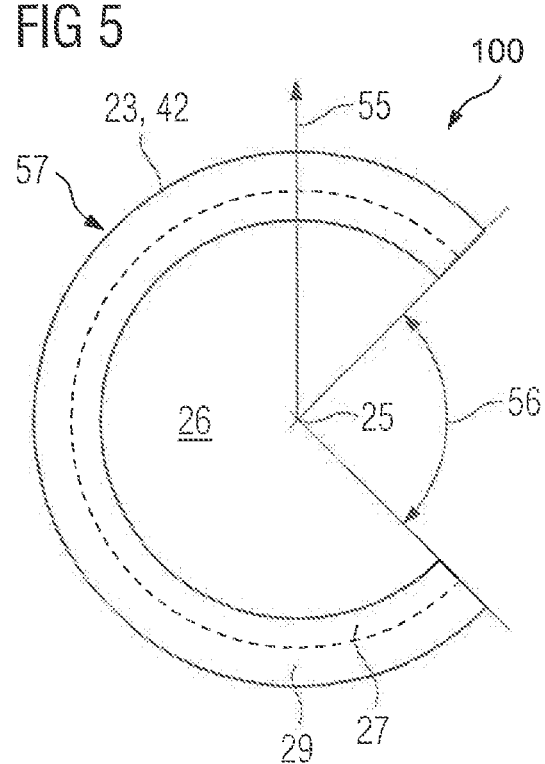
FIG. 5 is a frontal view of a second embodiment of a spacer element for use in a multi-plate clutch according to the present invention.
Figure 6:
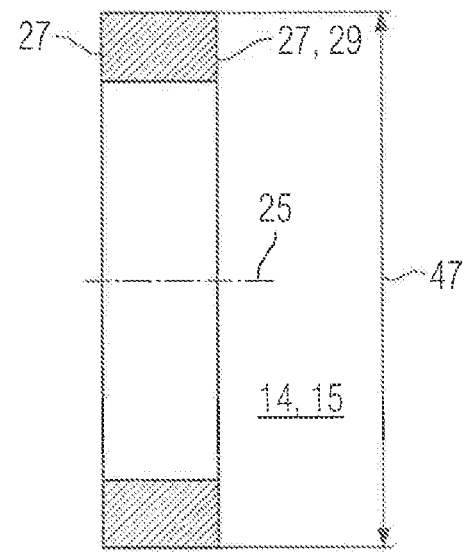
FIG. 6 is a sectional view of the spacer element of FIG. 5.

FIG. 5 and FIG. 6 diagrammatically illustrate a second embodiment of a spacer element 23 which can be used as an axial offset stop 42 in the multi-plate clutch 100. Analogously to FIG. 3, the spacer element 23 has a front side 27 the radial external area of which is designed as a contact area 29 for the stop of an end face 15 of a second flange 14. A radial direction is here understood to mean a direction in accordance with the arrow 55. Likewise, the size of the contact area 29 is defined inter alia by an outer diameter 47 of the spacer element 23. With regard to a screw axis 25, the spacer element 23 is interrupted at an angle of aperture 56 and therefore essentially has a C-shape 57. The angle of aperture 56 is designed such that the spacer element 23 can be attached to a lamellar packet ring 26 in a form-fitting manner.

Figure 7:
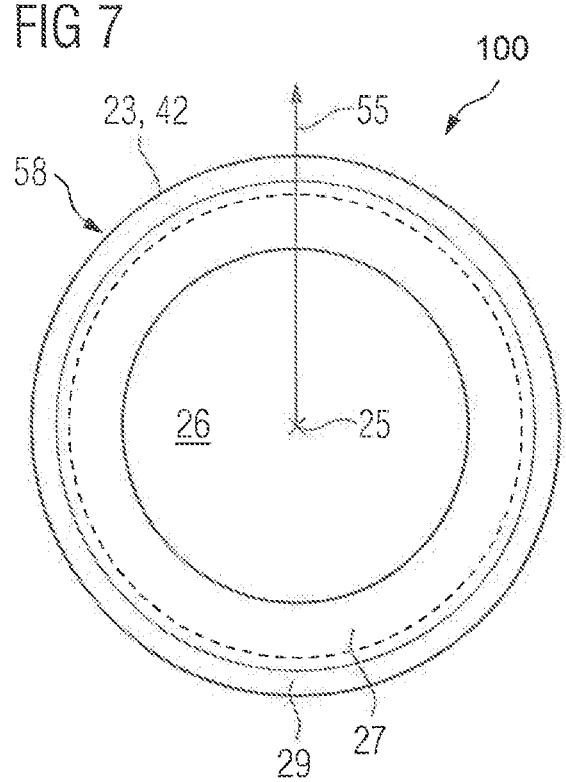
FIG. 7 is a frontal view of a third embodiment of a spacer element for use in a multi-plate clutch according to the present invention.
Figure 8:
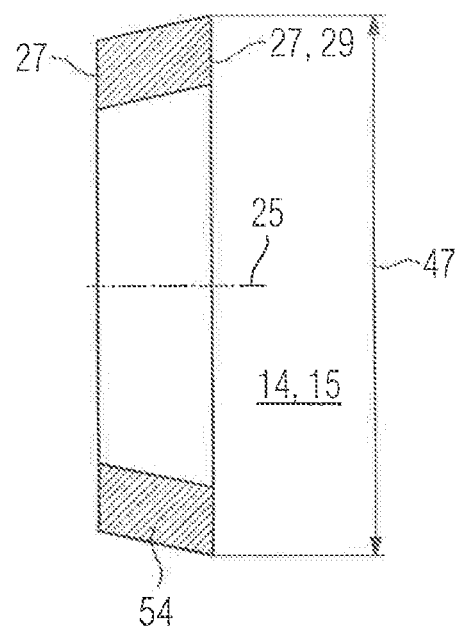
FIG. 8 is a sectional view of the spacer element of FIG. 7.

FIG. 7 and FIG. 8 show a third embodiment of a spacer element 23 which can be used in the multi-plate clutch 100 to the axial offset stop 42. The spacer element 23 has a ring shape 58 for this purpose. In a radial outer area on a front side 27 of the spacer element 23, which in the assembled state faces an end face 15 of a second flange 14, a contact area 29 is formed. The contact area 29 is suitable for supporting the end face 15 of the second flange 14. The size of the contact area 29 is defined inter alia by the outer diameter 47 of the spacer element 23. A radial direction is to be understood as a direction in accordance with the arrow 55 with regard to a screw axis 25. Furthermore, the spacer element 23 is designed as a disk spring 54.

Figure 9:
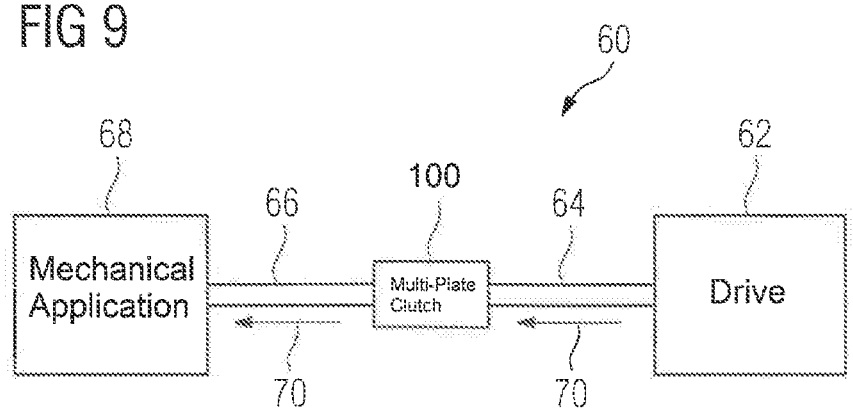
FIG. 9 is a schematic block diagram of an industrial application according to the present invention.

FIG. 9 shows a diagrammatic view of the structure of an industrial application according to the present invention, generally designated by reference numeral 60. The industrial application 60 includes a drive 62 and a mechanical application 68. The drive 62 has an output shaft 64 which is designed to transmit drive power 70 which is provided by the drive 62. Furthermore, the mechanical application 68 has an input shaft 66 which is designed to supply the provided drive power 70 of the mechanical application 68. The output shaft 64 and the input shaft 66 are connected to one another by way of a multi-plate clutch 100 for this purpose. The multi-plate clutch 100 is embodied according to one of the embodiments described.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A multi-plate clutch, comprising:
   a plate fin;
   first and second flanges connected to one another in a torque-transmitting manner via the plate fin;
   a screw fastener configured to brace the plate fin on a first lamellar bore with the first flange; and
   a first spacer element arranged on the plate fin with axial play between the first spacer element and the second flange to support a first axial movement of the second flange.

2. The multi-plate clutch of claim 1, further comprising a lamellar packet ring, said first spacer element being arranged radially on the lamellar packet ring.

3. The multi-plate clutch of claim 1, wherein the first spacer element has a front side defining a contact area for striking the second flange.

4. The multi-plate clutch of claim 1, wherein the first spacer element arranged between the plate fin and the second flange is configured for movement in an axial direction.

5. The multi-plate clutch of claim 1, wherein the spacer element is ring-shaped or C-shaped.

6. The multi-plate clutch of claim 1, wherein the first spacer element is made of steel, plastic material, or soft metal.

7. The multi-plate clutch of claim 1, further comprising a catch ring configured to brace the plate fin with the first flange.

8. The multi-plate clutch of claim 2, wherein the plate fin is braced with the first flange by the lamellar packet ring.

9. The multi-plate clutch of claim 1, further comprising a nut attached to the first screw fastener and having a collar to support a second axial movement of the second flange.

10. The multi-plate clutch of claim 1, wherein the first spacer element is configured as a disk spring.

11. The multi-plate clutch of claim 1, further comprising a plurality of said plate fin and a plurality of assigned lamellar packet rings arranged between the first and second flanges.

12. The multi-plate clutch of claim 1, further comprising a second screw fastener configured to brace the plate fin on a second lamellar bore with the second flange, and a second spacer element arranged on a front side of the second flange to support an axial movement of the first flange.

13. The multi-plate clutch of claim 12, wherein the plate fin on the first and second lamellar bores is connected alternately to the first and second flanges along a circumferential direction.

14. An industrial application, comprising:
a drive having an output shaft for transmitting a drive power;
a mechanical device having an input shaft for receiving the drive power from the drive; and
a multi-plate clutch configured to connect the output shaft of the drive and the input shaft of the mechanical device in a torque-transmitting manner, said multi-plate clutch comprising a plate fin, first and second flanges connected to one another in a torque-transmitting manner via the plate fin, a screw fastener configured to brace the plate fin on a first lamellar bore with the first flange, and a first spacer element arranged on the plate fin with axial play between the first spacer element and the second flange to support a first axial movement of the second flange.

15. The industrial application of claim 14, wherein the multi-plate clutch includes a lamellar packet ring, said first spacer element being arranged radially on the lamellar packet ring.

16. The industrial application of claim 15, wherein the plate fin is braced with the first flange by the lamellar packet ring.

17. The industrial application of claim 14, wherein the first spacer element arranged between the plate fin and the second flange is configured for movement in an axial direction.

18. The industrial application of claim 14, wherein the multi-plate clutch includes a nut attached to the first screw fastener and having a collar to support a second axial movement of the second flange.

19. The industrial application of claim 14, wherein the multi-plate clutch includes a second screw fastener configured to brace the plate fin on a second lamellar bore with the second flange, and a second spacer element arranged on a front side of the second flange to support an axial movement of the first flange.

20. The industrial application of claim 14, wherein the plate fin on the first and second lamellar bores is connected alternately to the first and second flanges along a circumferential direction.

\* \* \* \* \*